Patented Sept. 16, 1952

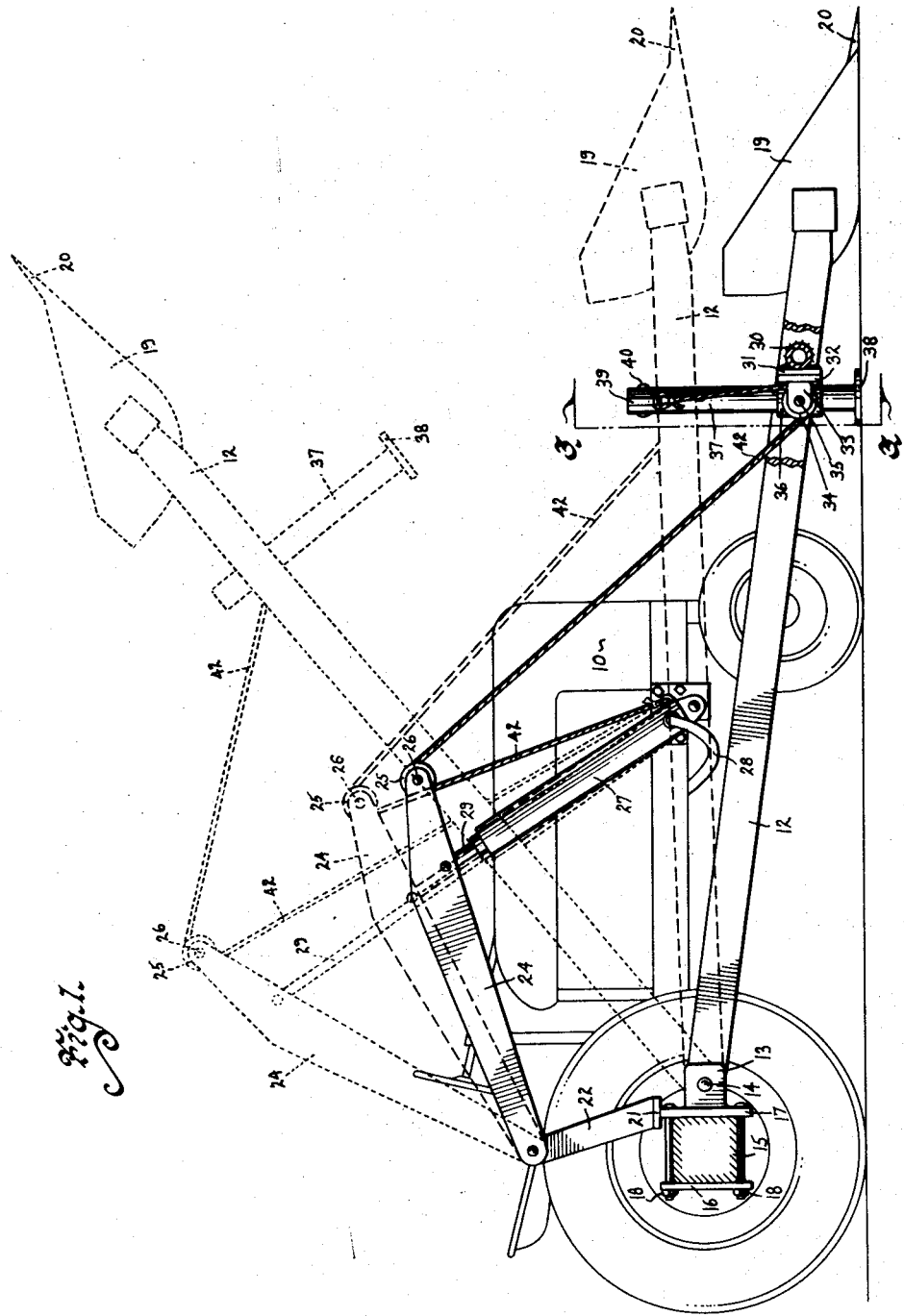

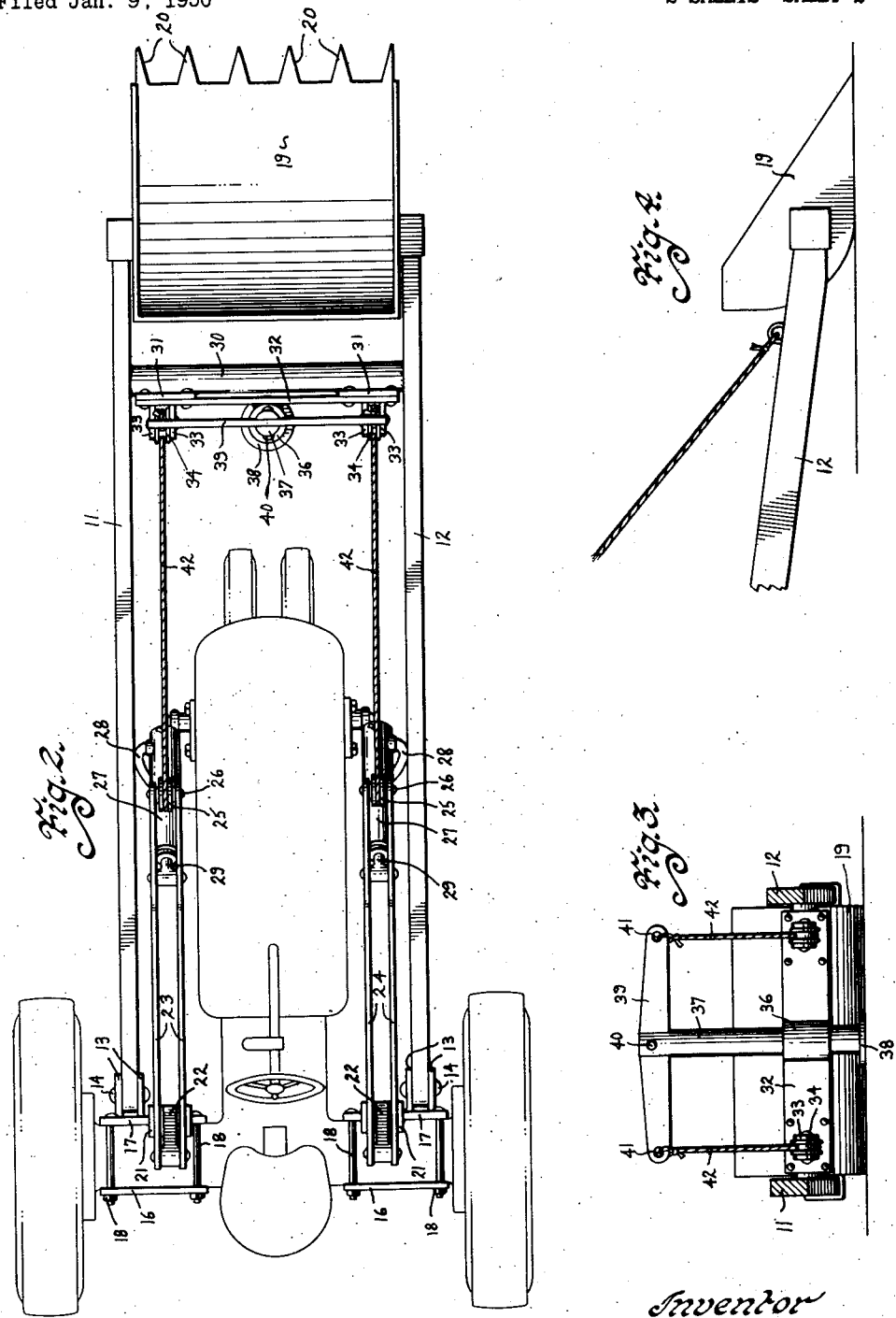

2,610,752

UNITED STATES PATENT OFFICE 2,610,752

LOAD LIFTING MECHANISM

Herman E. Luebbers, Fort Dodge, Iowa

Application January 9, 1950, Serial No. 137,603

5 Claims. (Cl. 214—131)

1

My invention relates to a load lifting mechanism for a tractor or the like, and is in the same art as my Patent No. 2,465,476, dated March 29, 1949, for a Tractor Loading Attachment.

In any load lifting mechanism attached to tractors or the like the scoop has a definite load capacity and the power generated by the tractor is generally capable of lifting this load without any undue strain. Of course, there is extra strain and maximum power required at the time of initial lift due to the inertia of the material to be moved. However, the chief difficulty in this connection is experienced when the scoop is projected into a bank of dirt, hay or the like. The initial weight on the scoop is considerably greater than its normal capacity and consequently a much greater force is required to lift it free to the point where only a scoop load remains to be lifted or moved by the tractor. In such a situation and also in initially lifting the scoop from its lowered position, the longer the boom, the greater the force required to lift it. Many lifting devices and means have been made to facilitate the initial raising of the boom and one of these is described in my patent above referred to. Such devices shift the fulcrum point in relation to the tractor frame and boom in order to increase the effect of the lifting force at the scoop and since every force has a counter-force, this counter-force in such devices has been directed to the tractor frame. Obviously, the closer to the scoop that the resistance to the counter-force is, the greater will be the leverage lifting force from the power applied. However, since the scoop extends forwardly of the tractor frame and since the tractor frame is the resistance for the counter-force, the forward portion of the frame provides a limiting means in the prior art for the most effective use of the power from the tractor.

Therefore, the principal object of my invention is to provide an attachment for the loading mechanism on a tractor or the like that is positioned on the boom forwardly of the tractor and that is designed to bear against the ground or other supporting surface when the loading mechanism begins to operate and thereby greatly increasing the initial leverage lifting power of the tractor by transferring the reaction force to the ground or like in the immediate vicinity of the scoop.

A further object of my invention is to provide a device of the above class that can be easily attached to or detached from a tractor and that can be left attached without interfering with the operation or transportation of the tractor loader.

A still further object of this device is to provide an attachment for a tractor loading mechanism that is capable of greatly increasing the initial load lifting force per unit of power applied over related devices in the prior art.

A still further object of my invention is to provide a load lifting mechanism for tractors or the like that is capable of producing greater leverage than prior devices of the same type.

A still further object of this invention is to provide a loader lifting mechanism of the "leverage type" that permits the scoop to be elevated to maximum height.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of a tractor showing my device attached thereto with the respective dotted lines indicating the position of the respective parts at different degrees of elevation.

Fig. 2 is a top view of the tractor and loading mechanism of Fig. 1,

Fig. 3 is a cross-sectional view of my attachment taken from the line 3—3 of Fig. 1, and Fig. 4 is a side view of the end of the boom and the scoop of the loading mechanism showing the manner of securing the lifting cable thereto without the use of my initial booster means.

Referring to the drawings I have used the numeral 10 to designate a conventional type tractor. The numerals 11 and 12 respectively designate two elongated beam members of the same size and shape oppositely disposed respectively at the sides of the tractor, as shown in Fig. 2. Each of the beam members 11 and 12 at their rear end is arranged between a pair of apertured ears 13 and vertically pivotally secured therein by means of the pin 14. The ears 13 are secured in any suitable manner to the rear axle housing 15 of the tractor, and in Figs. 1 and 2 I show this by means of the vertical support plate members 16 and 17 respectively secured in engagement with opposite sides of the axle housing 15 by means of the bolts and nuts 18. The ears 13 are secured to the front sides of the plates 17, respectively, as shown in Fig. 1. Thus the beams are detachably hingedly secured to the tractor. The forward end of each of the beams 11 and 12 are secured respectively to the opposite sides of a scoop 19 which may be provided with tines 20. The details, release mechanism, etc. of the scoop portion are not herein important and are not shown in detail.

The numeral 21 designates two horizontal bearing plates respectively secured to the top edge of each of the front support plates 17 and a substantially vertical inclined elongated support beam 22 is secured to the center portion of each plate 21, as shown in Fig. 1 and Fig. 2.

The numerals 23 and 24 respectively designate two pair of like elongated arm members. Each pair of arms are arranged in longitudinal parallel spaced relation and are vertically pivotally secured at their respective rear ends to opposite sides of the top of the support beams 22 respectively. A pulley wheel 25 is arranged between the front ends of each pair of arms by means of a pin 26, shown in Fig. 2. The numeral 27 designates two common hydraulic lifts or jacks that are positioned on opposite sides of the tractor frame and vertically pivotally secured thereto. Each jack is connected to a source of fluid under pressure by means of the hoses 28. The top of each plunger 29 respectively of the jacks 27 is pivotally secured to the forward portion of each respective pair of arms 23 and 24, as shown in Fig. 2.

The numeral 30 designates a cross-bar transversely arranged between and secured to the forward portion of the beams 11 and 12 and rearwardly from the scoop 19. It is to this cross-bar that I secure my attachment for the lifting mechanism which I will now describe.

A pair of rectangular bearing plate members 31 are vertically secured respectively to the end portions of the rearwardly side of the cross-bar 30 by any suitable means such as brazing, welding or the like as shown in Figs. 1 and 2. Secured to the bearing plates 31 is a support bar 32 that extends transversely the beams 11 and 13 in substantially a parallel plane to the cross-bar 31, and projecting rearwardly from each end of the support bar is a pair of apertured ears 33. A pulley wheel 34 is arranged between each pair of ears 33 by means of a pin 35.

The numeral 36 designates a cylindrical collar member having a length substantially the same as the width of the support bar 32. This collar is vertically secured to the center portion of the bar 32 by brazing, welding or the like, as shown in Figs. 2 and 3. The numeral 37 designates a vertical support rod 37 that is mounted within the collar so that the collar is vertically slidable thereon, as will later be described. The bottom of the rod 37 is designed to bear against the ground or other supporting surface and to increase the bearing area on the bar the bottom is enlarged, as shown at 38. The top of the rod 37 is slotted to receive the horizontal beam member 39 which is secured therein by means of a pin 40, as shown in Figs. 2 and 3. A hole 41 is provided through each end portion of the beam 39.

The numeral 42 designates two cables respectively with each having one end secured to the bottom portion of one of the jacks 27 and its other end secured in one of the holes 41. Each cable 42 respectively is reeved over one of the pulleys 25 on the arms 23 and 24 and under one of the pulleys 34 in ears 33, as illustrated in Figs. 1 and 2.

Thus constructed and arranged this device will operate in the following manner:

In Fig. 1 the solid lines show the position of the loading mechanism in its lowered position ready for the scoop to be moved under material to be lifted. Obviously, when the scoop has been moved under material such as dirt, hay or the like a much greater force is required to initially lift it than to maintain it in elevated position once the scoop has shaken off all but a normal load. To supply this greater force the tractor operated applies fluid pressure from the tractor to the jacks 27. This will, of course, extend the plungers 29 which in turn will elevate the arms 23 and 24. When this occurs force will be applied to the cables 42 so there is a downwardly force acting on the beam 39, an upwardly force acting on the pulleys 34, and an upwardly pull at the point where the cable is secured to the jack. Since the beam 39 is mounted on the vertical rod 37 the downwardly force on this beam is transmitted to that rod. However, the bottom of the rod 37 bears against the ground and thereby all force in that direction is resisted with the result that the beams 11 and 12 will move upwardly as the arms 23 and 24 rise with the collar 36 sliding on the rod 37. Thus the rod 37 by bearing against the ground at a point close to the scoop greatly increases the leverage for the lifting mechanism over the prior art. In addition, the use of pulleys and cables likewise increase the lifting power of the tractor motor.

When the collar 36 has moved upwardly to engagement with the beam 39, the lifting force from the cable on the pulley 34 will be applied upwardly against the beam 39 and the entire attachment will be elevated, as illustrated by the upper dotted lines in Fig. 1. As the vertical rod 37 leaves the ground and the arms 23 and 24 are forced upwardly by the plungers 29 the pulleys 25 will exert a pulling force towards both ends of the cable. However, since one end of the cables is secured to the tractor frame and cannot move, the effect is a leverage action to raise the scoop. In Fig. 4 I show how the cable would be arranged for lifting the scoop without the attachment which has been described above. If used without the attachment, the lifting mechanism would operate in the same manner as hereinbefore described after the attachment has been raised from the ground.

Some changes may be made in the construction and arrangement of my load lifting mechanism without departing from the real spirit and purpose of my invention, and it is my intention to cover by my claims, any modified forms of structure or use of mechanical equivalents which may be reasonably included within their scope.

I claim:

1. In a load receiving mechanism designed for use on a tractor, two elongated beam members disposed respectively at the sides of said tractor and vertically pivotally secured at one end thereto, a load receiving means secured to the other end of said beams, two pairs of arm members disposed respectively at the sides of said tractor and vertically pivotally secured at one end thereto, a pulley wheel mounted between the forward ends of each pair of arms, means for raising and lowering said arm members, a cross-bar transversely secured to the forward portion of said beam members, a collar member secured to said cross-bar with its cylindrical post-receiving portion disposed vertically, a support post member mounted through said collar so that its lower end is capable of contacting and bearing against the ground as the load is initially lifted, a pulley wheel mounted on said cross-bar on each side of said collar member and spaced therefrom, a horizontal beam centrally mounted in the top of said support rod and a pair of cables respectively secured at one end to said tractor frame, at the other end to one end of said horizontal beam member with each cable reeved above one pulley on one pair of arms and under one pulley on said cross-bar.

2. In combination with a vehicle, an elongated beam having its rear end pivoted to said vehicle, a load receiving member on the forward end of said elongated beam, a lifting arm vertically pivotally secured at its rear end to said tractor, a pulley wheel on the forward end of said lifting arm, a collar member secured to the forward end portion of said elongated beam with its cylindrical post-receiving portion disposed vertically, a post member mounted through said collar member so that its lower end contacts and bears against the ground as the load is initially lifted, said collar member slidable on said post member, a pulley wheel mounted on the forward end portion of said elongated beam, a cable member secured at one end to the upper portion of said post and at the other end to said vehicle and said cable reeved over the pulley on said lifting arm and under the pulley on said elongated beam.

3. In combination with a tractor, an elongated beam having its rear end pivoted to said tractor, means for raising and lowering said elongated beam, a load receiving member on the forward end of said elongated beam, a bar member secured to the forward portion of said elongated beam member, a collar member secured to said bar member with its cylindrical post-receiving portion disposed vertically, a support post mounted through said collar member so that its bottom end is capable of bearing against the ground as the load is initially lifted, a pulley wheel on said bar member, a cable secured at one end to the upper portion of said support member and at its other end to said tractor frame; the intermediate length of said cable reeved under said pulley wheel and operatively associated with said means for raising and lowering said elongated beam.

4. In combination with a tractor, an elongated beam having its rear end pivoted to said tractor, means for raising and lowering said elongated beam, a load receiving member on the forward end of said elongated beam, a bar member secured to the forward portion of said elongated beam member, a collar member secured to said bar member with its cylindrical post-receiving portion disposed vertically, a support post mounted through said collar member so that its lower end contacts and bears against the ground as the load is initially lifted, a horizontal beam mounted on the top of said support member, a pulley wheel on said bar member, a cable secured at one end to the said horizontal beam and at its other end to said tractor frame; the intermediate length of said cable reeved under said pulley wheel and operatively associated with said means for raising and lowering said elongated beam.

5. In a load receiving mechanism designed for use on a tractor, two elongated beam members disposed respectively at the sides of said tractor and vertically pivotally secured at one end thereto, a load receiving means secured to the other end of said beams, two pairs of arm members disposed respectively at the sides of said tractor and vertically pivotally secured at one end thereto, a pulley wheel mounted between the forward ends of each pair of arms, means for raising and lowering said arm members, a cross-bar transversely secured to the forward portion of said beam members, a collar member secured to said cross-bar with its cylindrical post-receiving portion disposed vertically, a support post member mounted through said collar so that its lower end is capable of contacting and bearing against the ground as the load is initially lifted, a pulley wheel mounted on said cross-bar on each side of said collar member and spaced therefrom, a horizontal beam centrally mounted in the top of said support rod and a pair of cables respectively secured at one end to said tractor frame, at the other end to one end of said horizontal beam member with each cable reeved above one pulley on one pair of arms and under one pulley on said cross-bar, and a means for limiting the sliding movement of said collar member in at least one direction.

HERMAN E. LUEBBERS.

REFERENCES CITED

The following references are of record in the file of this patent:

UNITED STATES PATENTS

| Number | Name | Date |
| --- | --- | --- |
| 2,417,560 | McNamara, Jr. | Mar. 18, 1947 |
| 2,429,717 | Gordon | Oct. 28, 1947 |
| 2,440,765 | Acton | May 4, 1948 |
| 2,472,223 | McElhinney et al. | June 7, 1949 |